(12) United States Patent
Velez-Cruz

(10) Patent No.: US 10,493,926 B2
(45) Date of Patent: Dec. 3, 2019

(54) AUTOMOTIVE DING AND DENTS PROTECTION SYSTEM

(71) Applicant: Alex Joel Velez-Cruz, Bayamon, PR (US)

(72) Inventor: Alex Joel Velez-Cruz, Bayamon, PR (US)

( * ) Notice: Subject to any disclaimer, the term of this patent is extended or adjusted under 35 U.S.C. 154(b) by 0 days.

(21) Appl. No.: 16/016,302

(22) Filed: Jun. 22, 2018

(65) Prior Publication Data
US 2019/0039536 A1   Feb. 7, 2019

Related U.S. Application Data

(60) Provisional application No. 62/541,141, filed on Aug. 4, 2017.

(51) Int. Cl.
| | |
|---|---|
| *B60R 13/04* | (2006.01) |
| *B60Q 9/00* | (2006.01) |
| *B60R 16/03* | (2006.01) |
| *B60J 5/04* | (2006.01) |
| *B60R 19/42* | (2006.01) |
| *B60J 11/06* | (2006.01) |

(52) U.S. Cl.
CPC ............ *B60R 13/04* (2013.01); *B60J 5/0493* (2013.01); *B60J 11/06* (2013.01); *B60Q 9/00* (2013.01); *B60R 13/043* (2013.01); *B60R 16/03* (2013.01); *B60R 19/42* (2013.01)

(58) Field of Classification Search
CPC ....... B60R 13/04; B60R 13/043; B60R 19/42; B60R 19/445; B60R 19/46; B60J 11/025; B60J 11/00; B60J 11/06
USPC ......................................................... 280/770
See application file for complete search history.

(56) References Cited

U.S. PATENT DOCUMENTS

| | | | | |
|---|---|---|---|---|
| 3,718,357 A * | 2/1973 | Hertzell | ................. | B60R 13/04 293/9 |
| 4,221,412 A * | 9/1980 | Miller | .................... | B60R 13/04 280/770 |
| 4,461,503 A * | 7/1984 | Melby | ..................... | B60R 13/04 293/118 |
| 4,666,196 A * | 5/1987 | McCoy | .................. | B60R 13/04 267/141 |
| 4,815,777 A * | 3/1989 | Campbell | ............... | B60R 13/04 293/107 |
| 4,961,605 A * | 10/1990 | Cawthron | .............. | B60R 13/04 293/128 |
| 5,004,281 A * | 4/1991 | Yamazaki | ............... | B60R 13/04 293/118 |
| 7,222,895 B2 * | 5/2007 | Ohara | .................. | B60R 19/445 293/118 |

(Continued)

*Primary Examiner* — Emma K Frick
(74) *Attorney, Agent, or Firm* — University of Puerto Rico; Eugenio J. Torres-Oyola; Victor M. Rodriguez-Reyes

(57) ABSTRACT

A device for protecting the automobile doors from scratches and dents to the finishes made by other cars or objects while the automobile is parked on a parking lot or other spaces. The device has an impact absorbing material attach to one side of and structural bar while a part of the door outside panel is attached to the other side of the structural bar. The structural bar and the absorbing material are stow inside the door frame. The structural bar is connected through a series of bearings and shafts to an electric motor that rotates the structural bar and exposes the impact material to provide the door protection. The motor is controlled by a solenoid valve.

5 Claims, 4 Drawing Sheets

(56) References Cited

U.S. PATENT DOCUMENTS

| | | | | |
|---|---|---|---|---|
| 7,393,028 | B2* | 7/2008 | Ohara | B60R 19/445 |
| | | | | 293/119 |
| 8,746,762 | B2* | 6/2014 | Darrett | B60R 13/04 |
| | | | | 293/128 |
| 9,238,445 | B2* | 1/2016 | Capitina | B60R 19/42 |
| 9,452,666 | B1* | 9/2016 | Suh | B60J 11/025 |
| 9,567,796 | B2* | 2/2017 | Andrae | B60R 13/043 |
| 9,713,952 | B1* | 7/2017 | Brueggeman | B60J 11/025 |
| 2002/0105197 | A1* | 8/2002 | Unterwagner | B60R 13/04 |
| | | | | 293/128 |
| 2009/0108575 | A1* | 4/2009 | Michael | B60R 11/00 |
| | | | | 280/770 |
| 2010/0301633 | A1* | 12/2010 | Chen | B60J 11/02 |
| | | | | 296/180.1 |
| 2013/0061524 | A1* | 3/2013 | Yano | B60J 5/047 |
| | | | | 49/192 |
| 2018/0162316 | A1* | 6/2018 | Saito | B60R 19/205 |

* cited by examiner

AUTOMOTIVE DING AND DENTS PROTECTION SYSTEM

TECHNICAL FIELD

The present disclosure relates to an automobile door protection system. Especially, the present disclosure relates to a system for protecting the cars doors from ding and dents made by other cars or object such as supermarket grocery carts loose at the parking lots.

BACKGROUND

Cars are usually a person's second most precious possession, with the person house being the first. A person concern and care for his own car, may not be shared by others citizens, especially on shopping malls and other places where large quantity of persons may gather. It is common for cars to receive damage to the doors while a person opens the door of the car parked next to it. It's also common for cars to receive damage to the doors from shopping carts that are not returned to the corrals and are freely rolling into the parked cars.

Some cars owners used commercially available protection such as magnetic plastic strips on the doors to provide shelter to their doors. Others use plastic covers on the door molding to avoid the dents produced by others cars doors. While this protection systems work for specific circumstances, the protection may fail if the impact is produced away from the door molding or if the magnetic strip is not installed when the owner parks the car.

BRIEF SUMMARY

It is an object of this invention to disclose means to protect the sides of automobile door panels from damage by means of a body trim guard which is composed of an impact absorbing material mounted on structural bar inside the panels of automobile doors and is retractable by means of a rotational movement of the structural bar.

Another example embodiment in the present disclosure is to provide a controls systems that electrically actuates a solenoid valve to unlock the metal bar and the impact material so it can rotate the body trim guard.

Another example embodiment in the present disclosure is to provide system rotation mechanism by action of an electric motor, spline shaft and a universal joint that rotates the impact material when the controls systems send a signal to the solenoid which had held the trim guard lock.

Another example embodiment in the present disclosure is to provide an electronic switch wired to receive a signal from the car shifter, sending a signal to the microcontroller to engage the pull solenoids, applying 12 volts and activate the motor by sending 12 volts to a voltage regulator to control the revolutions of the motor when the shifter is placed in "parking".

BRIEF DESCRIPTION OF THE DRAWINGS

The invention provides a protective device with an impact absorbing material that can be permanently attached to a rotating bar inside the door and/or side panels of an automobile so that when the automobile is positioned in the parking shift, the rotating bar expose the impact material will preclude the opening of adjacent car doors or other like objects will impact against the device rather than the automobile body.

DETAILED DESCRIPTION OF THE PREFERRED EMBODIMENTS

Figure 1:
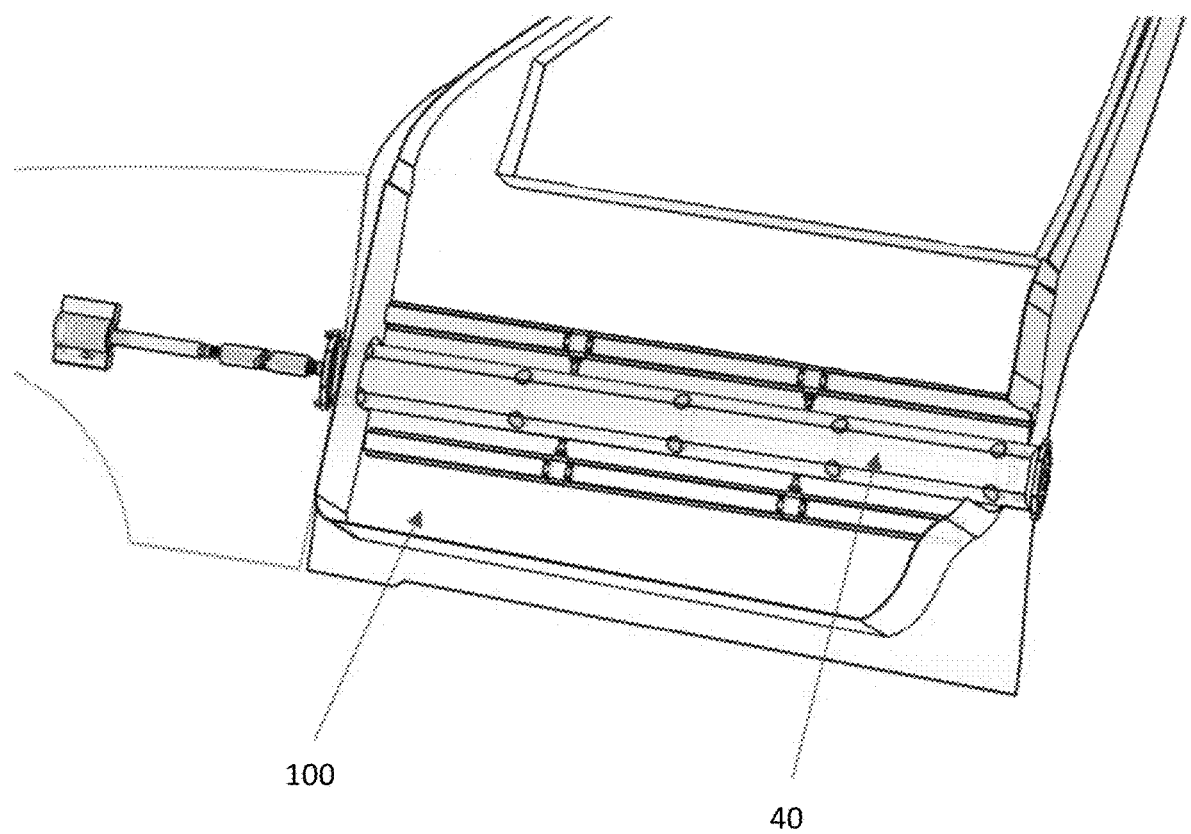
FIG. 1 is a perspective view of an automobile door exterior side with an example embodiment of an automobile ding and dent protection system installed.

FIG. 1 illustrates an example embodiment of an automotive ding and dent protection device 40 inside of an automotive door with the impact material extruding from the automotive exterior door panel 100.

Figure 2:
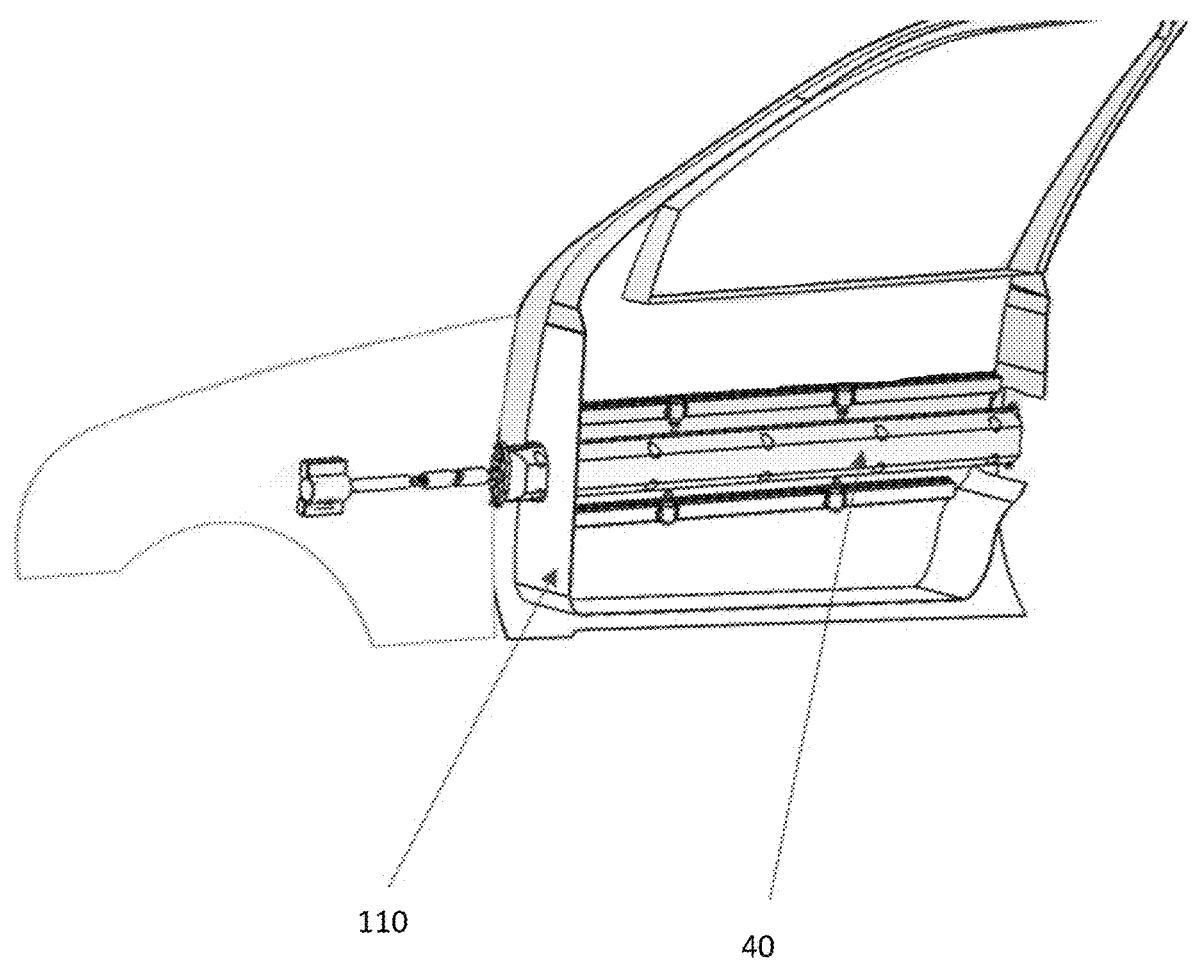
FIG. 2 is a perspective view of an automobile door interior side with an example embodiment of an automobile ding and dent protection system installed.

FIG. 2 illustrates an example embodiment of an automotive ding and dent protection device 40 inside of an automotive door and the automotive interior door panel 110.

Figure 3:
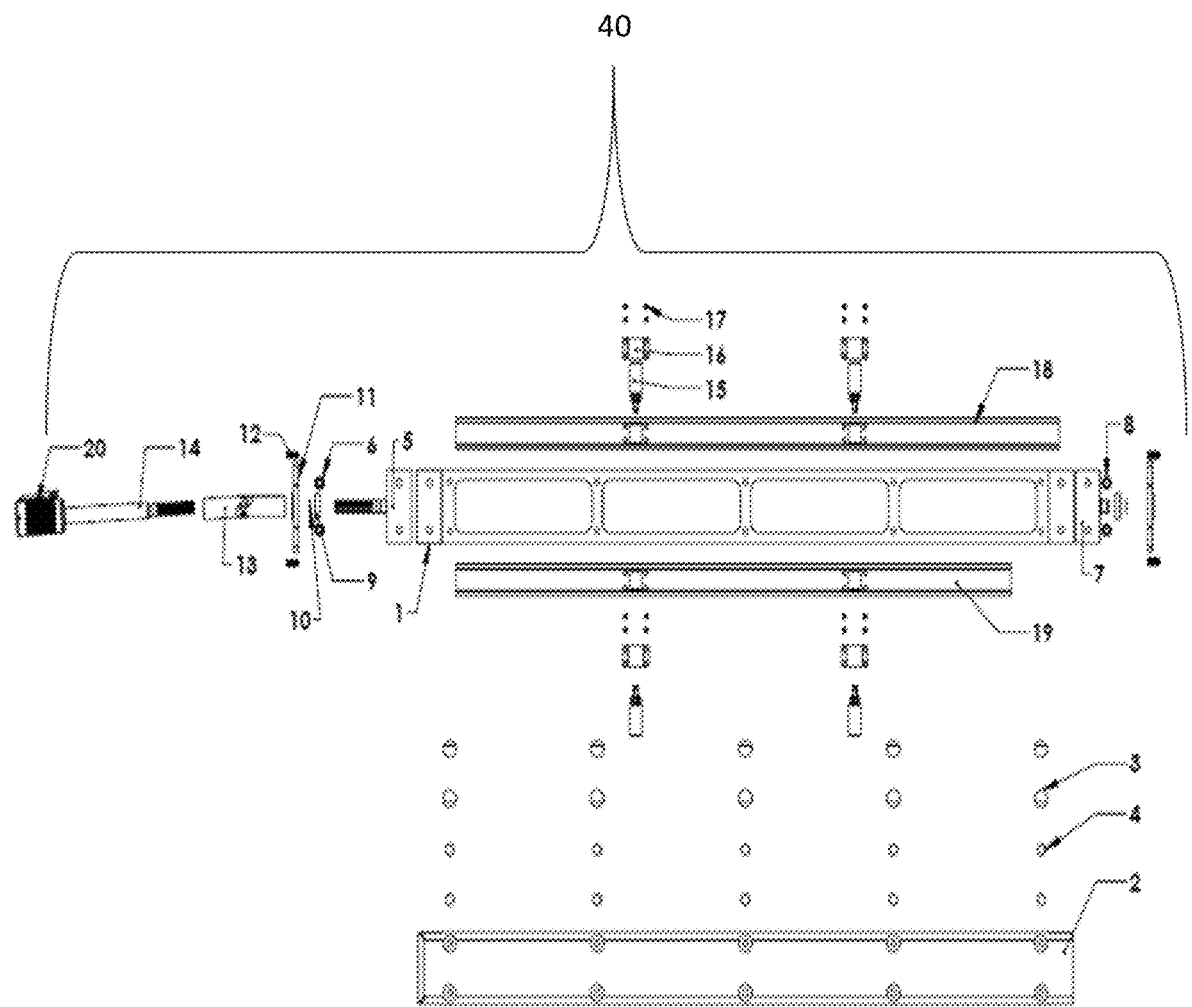
FIG. 3 is a plan view of the system components.

FIG. 3 shows the internal components of an embodiment of an automotive ding and dent protection device 40. FIG. 1 shows the structural bar 1 that holds the impact material 2, the rear and front bar holders and serves as structure for the system. Structural bar 1 bear vibration, bending stress and the impact received on the door. Structural bar 1 conforms to the shape of the door and could be re-designed based on the shape and curvature of the door.

FIG. 3 also illustrate an example embodiment of the impact material 2, which absorbs the impact received by the door. It can be re-designed if needed based on the shape and curvature of the door. Impact material 2 is held in place by hex bolts 4 to the structural bar.

FIG. 3 also illustrate an example embodiment of the screw caps 3 that serve to cover the hex bolts 4 that hold the impact material 2 in place.

FIG. 3 also illustrate an example embodiment of the hex bolt 4 as a joint method for the impact material 2 and the structural bar 1. The use of hex bolt 4 allows the impact material 2 to be replaced without the need of a complete system disassembly.

FIG. 3 also illustrate an example embodiment of the front bar holder 5 that joins the structural bar 1 and the impact material 2 to the motor/u-joint shaft 14 at the front of the door. It serves also as the rotation point for the structural bar 1 to rotate 180 degrees over its axis. The front bar holder 5 bear vibration and bending stress on the shaft.

FIG. 3 also illustrate an example embodiment of the SHCS screw 6 that joins the bar holder 5 to the structural bar 1. There are four SHCS screw 6, two for the front bar holder 5 and two for the back bar holder 5.

FIG. 3 shows rear bar holder 7 that joins the structural bar 2 and the impact material 1 to the rear of the door. Rear bar holder 7 serves as the rotation point for the structural bar 1 to rotate 180 degrees over its axis. Rear bar holder 7 bears vibration and bending stress on the shaft.

FIG. 3 shows SHCS screw 8 that joins the bar holder to the structural bar 1.

FIG. 3 shows skf ball bearing 9 that allows the rotation of the structural bar 1. There are two skf ball bearing 9, one at the front bar holder 5 and one at the rear bar holder 7.

FIG. 3 also illustrate an example embodiment of the external retaining ring 10 use to hold the skf ball bearing 9 in place.

FIG. 3 also illustrate an example embodiment of the bearing housing 11 that hold the structural bar 1 to the door's structure with socket set screw flat point 12.

Universal joint assembly 13 allows an axial displacement as well as the rotation of the structural bar 1, transferring the torque from the motor shaft 14 to the front bar holder 5.

FIG. 3 also illustrate an example embodiment of the motor/u-joint shaft 14, used to transfer the torque from the motor 20 to the universal joint assembly 13.

Sealed linear solenoid 15 prevents undesired rotation of the structural bar 1 when impacted. A small shaft is always inserted on a hole in the structural bar 1 and when the structural bar 1 needs to rotate, the solenoid 15 pulls the shaft and after the rotation, a spring releases the shaft to its initial position, holding the structural bar 1 in place.

Solenoid holder 16 holds the solenoid 15 in place using shcs screw 17.

Structural support bar-up 18 is used for support and to maintain the door integrity. Structural support bar-up 17 serves as anchor point for solenoid 15.

FIG. 3 also illustrate an example embodiment of the structural support bar-down 19 that serves as anchor point for the solenoid 15.

Worm-geared motor 20 is used to rotate and to prevent back rotation of the structural bar 1.

Figure 4:
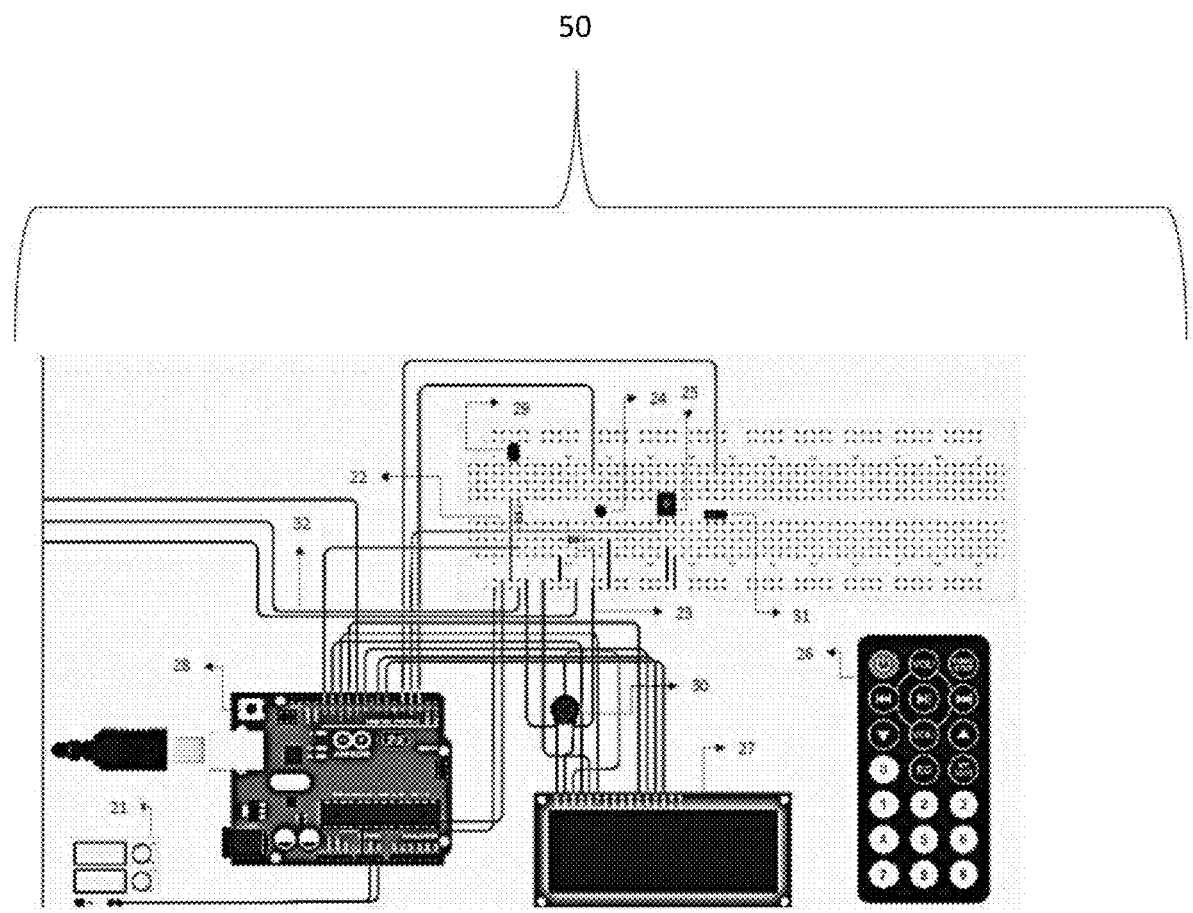
FIG. 4 is a plan view of the controls system components.

FIG. 4 illustrates an example embodiment of the controls systems 50 used in an automotive ding and dent protection device 40. The internal components of the controls systems 50 include the battery 21 that provides voltage to the microcontroller.

FIG. 4 also illustrate an example embodiment of the pull solenoid 15 that lock the ding and dent protection device 40 when is not activated.

FIG. 4 also illustrate an example embodiment of the fuse 22 that protects the controls system 50 from any voltage peaks.

Push button 24 allows for a local activation of the ding and dent protection device 40.

FIG. 4 also illustrate an example embodiment of the wireless receiver 25 that acquires the signal from the remote button.

FIG. 4 also illustrate an example embodiment of the display monitor 27 that is a human interface that shows the status of the lock the ding and dent protection device 40.

Voltage regulator 28 receives the voltage before it enters the motor 20 and regulates the output voltage.

FIG. 4 also illustrate an example embodiment of the led light 29 that is a visual confirmation that the ding and dent protection device 40 is activated.

Shifter switch 30 represent when the car is being placed on the parking position.

Although the protective device provided by the present invention have been described with a preferred embodiment, due to large quantity of cars models and the different shapes of those cars, it's is only natural that modifications and variations may be made to fit the cars geometry without departing from the scope of this invention as set forth in the following claims. Such modifications and variations are considered to be within the purview and scope of the appended claims.

What is claimed is:

1. An apparatus for protecting the outside surface of a vehicle from dings, dents and scratches, comprising:
    an impact absorbing material;
    a rotative structural bar;
    an electrical motor for rotating said rotative structural bar, said electrical motor stored inside said vehicle and connected to said rotative structural bar via a first shaft;
    wherein the rotative structural bar includes a front bar holder and rear bar holder for joining the rotative structural bar and the impact absorbing material to the outside surface of the vehicle;
    wherein the front bar holder and rear bar holder serve as rotation points for the rotative structural bar to rotate 180 degrees over its axis;
    wherein the front bar holder is connected to a first ball bearing and the rear bar holder is connected to a second ball bearing, which in turn facilitate the rotation of the rotative structural bar;
    a power source for providing energy to said electrical motor, said power source stored inside said vehicle and connected to said electrical motor;
    at least one solenoid;
    wherein the rotative structural bar comprises a second shaft and at least one hole capable of receiving the second shaft, which when received by the at least one hole, prevents the undesired rotation of the rotative structural bar;
    wherein said at least one solenoid is connected to the second shaft via a spring mechanism, such that when the rotative structural bar needs to rotate, the at least one solenoid pulls the shaft and allows the rotation of the structural bar, and wherein once the structural bar finishes its rotation, the spring mechanism releases the second shaft back to the at least one hole in the rotative structural bar; and
    a remote control to remotely activate said electrical motor.

2. The apparatus as defined in claim 1, wherein the remote control further comprises a microcontroller that emits control signals to control to the electrical motor and the at least one solenoid.

3. The apparatus as defined in claim 1, wherein said power source sends a voltage signal to a microcontroller, which in turn causes the electrical motor to operate and the at least one solenoid to pull the second shaft until the rotative structural bar reaches a desired position, once the desired position is reached, said voltage signal will stop and cause the at least one solenoid to return to its original position, thus securing and restricting the movement of said rotative structural bar.

4. The apparatus as defined in claim 1, wherein said electrical motor is capable of remote activation by emitting a voltage signal that causes a microcontroller to activate the operation of said at least one solenoid once the remote button of said remote control is pressed while the vehicle's shifter is set to parking mode.

5. The apparatus as defined in claim 1, further comprising an LCD screen configured to inform a driver of the vehicle that the apparatus is engaged.

\* \* \* \* \*